United States Patent
Kaltenegger et al.

(10) Patent No.: US 7,872,091 B2
(45) Date of Patent: Jan. 18, 2011

(54) ELECTRICAL INSULATION SYSTEM BASED ON POLY(BUTYLENE TEREPHTHALATE)

(75) Inventors: Kurt Kaltenegger, Lengnau (CH); Xavier Kornmann, Lauchringen (DE); Jens Rocks, Freienbach (CH); Reto Weder, Habsburg (CH)

(73) Assignee: ABB Research Ltd, Zurich (CH)

( * ) Notice: Subject to any disclaimer, the term of this patent is extended or adjusted under 35 U.S.C. 154(b) by 323 days.

(21) Appl. No.: 12/102,600

(22) Filed: Apr. 14, 2008

(65) Prior Publication Data

US 2008/0202793 A1 Aug. 28, 2008

Related U.S. Application Data

(63) Continuation of application No. PCT/CH2006/000554, filed on Oct. 9, 2006.

(30) Foreign Application Priority Data

Oct. 14, 2005 (EP) .................. 05405586

(51) Int. Cl.
*C08G 63/02* (2006.01)
*C08G 64/00* (2006.01)
(52) U.S. Cl. .................. 528/272; 174/137 B; 524/413; 524/424; 528/176; 528/271
(58) Field of Classification Search ............ 174/137 B; 524/413, 424; 528/176, 271, 272
See application file for complete search history.

(56) References Cited

U.S. PATENT DOCUMENTS

| 4,043,971 | A | 8/1977 | Wurmb et al. | |
|---|---|---|---|---|
| 5,091,135 | A | * | 2/1992 | Okada et al. ........... 264/272.13 |
| 5,191,013 | A | | 3/1993 | Cook et al. |
| 5,648,454 | A | | 7/1997 | Brunelle |
| 2004/0106713 | A1 | * | 6/2004 | Avakian ..................... 524/404 |
| 2004/0225058 | A1 | | 11/2004 | Takekoshi et al. |

FOREIGN PATENT DOCUMENTS

EP 0 469 607 (A2) 2/1992
EP 0 869 141 (A1) 10/1998

OTHER PUBLICATIONS

Form PCT/ISA/210 (International Search Report) dated Nov. 28, 2006.
Form PCT/ISA/237 (Written Opinion of the International Searching Authority) dated Nov. 28, 2006.
European Search Report dated Apr. 6, 2006.
Notification Concerning Transmittal of International Preliminary Report on Patentability, and the International Preliminary Report on Patentability issued by the International Bureau.

* cited by examiner

*Primary Examiner*—Terressa M Boykin
(74) *Attorney, Agent, or Firm*—Buchanan Ingersoll & Rooney PC

(57) ABSTRACT

An electrical insulation system and method are disclosed which are based on poly(butylene terephthalate), wherein the poly(butylene terephthalate) contains a polymerized cyclic low molecular weight oligomeric poly(butylene terephthalate) resin. At least one filler material or a mixture of filler materials can be included. At least one hydrophobic compound or a mixture of hydrophobic compounds can also be included.

34 Claims, 3 Drawing Sheets

| | Mechanical | | | | | | | Thermal | | Electrical | |
|---|---|---|---|---|---|---|---|---|---|---|---|
| | Tensile | | | Flexural | | Double Torsion | | Glass Transition | Thermal Expansion Coefficient (CTE) | Dielectric | |
| | Strength | E | ε | Strength | E | $K_{IC}$ | $G_{IC}$ | Tg (DSC) | | ε (50 Hz, 23°C) | Tan δ (50 Hz, 23°C) |
| SI Units | MPa | GPa | % | MPa | GPa | $MPa.m^{1/2}$ | $J/m^2$ | °C | $10^{-6}/K$ | - | - |
| Epoxy + 65 wt% silanised silica* | 80-105 | 11.3-11.7 | 1.2-1.6 | 130-150 | 11.3-11.8 | 2.4-2.6 | 490-530 | 100-115 | 32-35 | 4 | 0.02 |
| CBT + 65 wt% silanised silica** | 67 | 11.1 | 1.7 | 134 | 10.7 | 6.1 | 3086 | | 69 | 4.1 | 0.007 |

Figure 1

ELECTRICAL INSULATION SYSTEM BASED ON POLY(BUTYLENE TEREPHTHALATE)

RELATED APPLICATIONS

This application claims priority under 35 U.S.C. §119 to EP Application 05405586.8 filed in Europe on Oct. 14, 2005, and as a continuation application under 35 U.S.C. §120 to PCT/CH2006/000554 filed as an International Application on Oct. 9, 2006 designating the U.S., the entire contents of which are hereby incorporated by reference in their entireties.

TECHNICAL FIELD

An electrical insulation system is disclosed based on poly (butylene terephthalate).

BACKGROUND INFORMATION

Currently, electrical insulation systems are made of anhydride-cured epoxies. The reason why electrical insulations are widely made from these materials is because they offer a good compromise between cost, electrical, mechanical and thermal properties. Anhydride-cured epoxies, however, present some important drawbacks especially from an environmental point of view. The use of anhydrides is under scrutiny of different authorities and could eventually be banned in the future. Anhydride-cured epoxies also are crack sensitive materials which causes problems in various manufacturing processes.

It has now been found that poly(butylene terephthalate) when made from a cyclic low molecular weight oligomeric poly(butylene terephthalate) resin can be used as an electrical insulation system and at the same time is an environmentally friendly recyclable material. Its excellent fracture toughness properties show the potential to decrease the occurrence of defects linked to matrix shrinkage upon cure. This material further offers new manufacturing possibilities which allow a decrease of production cycle time and, due to the non-exothermal polymerization reaction, also offers the possibility of manufacturing bulky parts with limited residual stresses.

Cyclic low molecular weight oligomeric poly(butylene terephthalate) resins have a low viscosity. Using such a cyclic low molecular weight oligomeric poly(butylene terephthalate) resin as a starting material has the advantage that, due to its low viscosity, it is possible to compound the oligomeric material up to 85% by weight with a filler material such as silica, which is of special importance for the manufacture of filled electrical insulation parts. This is not possible with known poly(butylene terephthalate). The resulting filler containing polymer made from the cyclic oligomeric compounds further has mechanical and electrical properties that cannot be matched with known filled poly(butylene terephthalate).

The low viscosity of the cyclic low molecular weight oligomeric poly(butylene terephthalate) resin gives also the possibility to manufacture large bulky electrical insulation parts with complex shapes, e.g. via injection molding, that cannot be manufactured directly with poly(butylene terephthalate). It further opens the possibility to impregnate reinforcements, like fiber fabrics or micatapes, which have been used in electrical insulation, which is not possible with known thermoplastics.

SUMMARY

An electrical insulation system and method are disclosed based on poly(butylene terephthalate), wherein said poly(butylene terephthalate) (i) has been obtained by polymerizing a cyclic low molecular weight oligomeric poly(butylene terephthalate) resin.

A method of making an electrical insulation system is disclosed based on poly(butylene terephthalate) comprising: (i) mixing a cyclic low molecular weight oligomeric poly (butylene terephthalate) resin in any desired sequence with any additive which is present; and (ii) polymerizing the mixture.

BRIEF DESCRIPTION OF THE DRAWINGS

Other objects and advantages will become apparent from the following detailed description when read in conjunction with the drawings, wherein:

FIG. 1 shows an exemplary comparison of properties of silica filled polybutylene terephthalate made from cyclic low molecular weight oligomers according to an Example 1 with properties of silica filled anhydride-cured epoxies;

DETAILED DESCRIPTION

Figure 2:
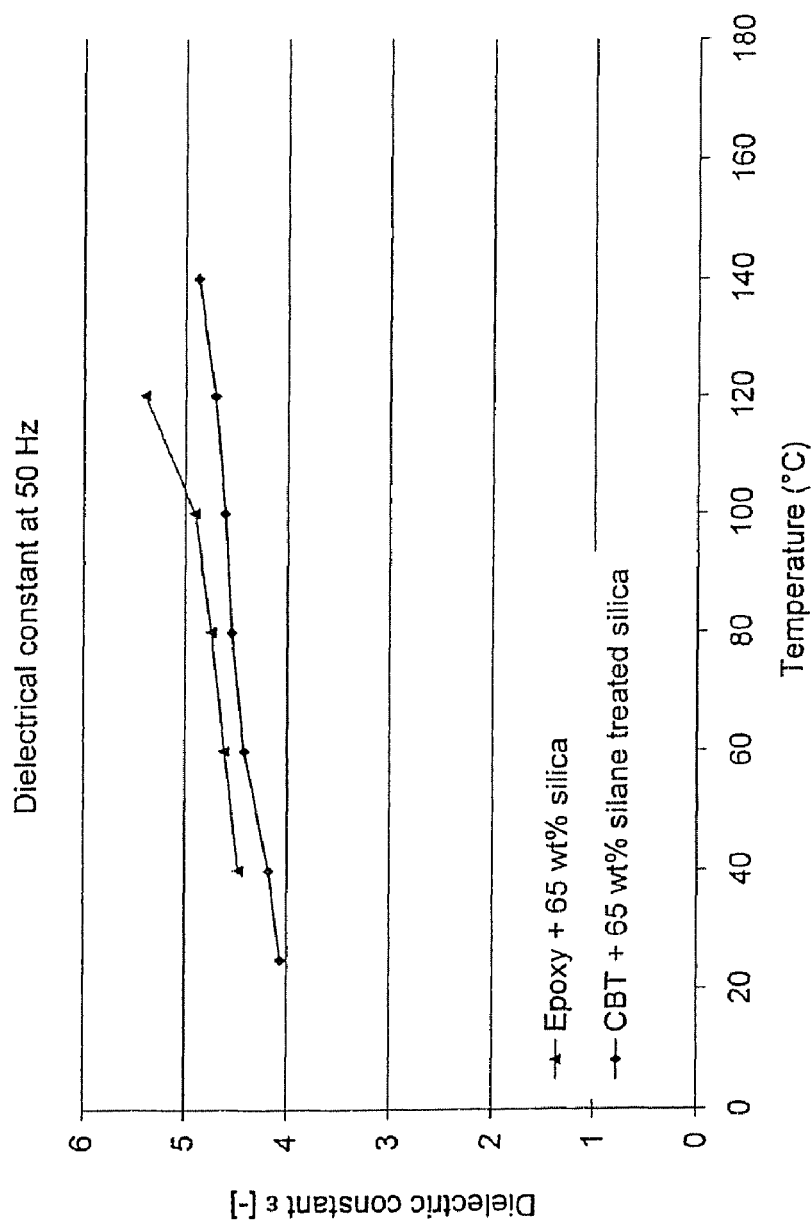
FIG. 2 shows an evolution of a dielectric constant at 50 Hz with temperature of CBT filled with 65 wt % silane treated silica with cured epoxy filled with 65 wt % silica.

An electrical insulation system is disclosed based on poly (butylene terephthalate), optionally containing further additives, wherein the poly(butylene terephthalate) (i) has been obtained by polymerizing a cyclic low molecular weight oligomeric poly(butylene terephthalate) resin. The poly(butylene terephthalate) can (ii) can contain at least one filler material or a mixture of such filler materials in an amount of up to 85% by weight, calculated to a total weight of the insulation system.

An alternate exemplary electrical insulation system is disclosed based on poly(butylene terephthalate), optionally containing further additives, wherein the poly(butylene terephthalate) (i) has been obtained by polymerizing a cyclic low molecular weight oligomeric poly(butylene terephthalate) resin and (ii) can contain at least one hydrophobic compound or a mixture of such compounds, preferably an organopolysiloxane, in an amount of 0.1% to 10% by weight, calculated to the total weight of the insulation system.

An alternate exemplary electrical insulation system is disclosed based on poly(butylene terephthalate), optionally containing further additives, wherein the poly(butylene terephthalate) (i) has been obtained by polymerizing a cyclic low molecular weight oligomeric poly(butylene terephthalate) resin, contains (ii) at least one filler material or a mixture of such filler materials in an amount of up to 85% by weight, and contains (iii) at least one hydrophobic compound or a mixture of such compounds, preferably an organopolysiloxane, in an amount of 0.1% to 10% by weight, each calculated to the total weight of the insulation system.

The present disclosure further refers to the use of poly (butylene terephthalate), optionally containing further additives as defined herein, in combination with an electrical insulation system, wherein the poly(butylene terephthalate) has been obtained by polymerizing a cyclic low molecular weight oligomeric poly(butylene terephthalate) resin.

A method of making an electrical insulation system is disclosed, optionally containing further additives as defined herein, which includes (i) mixing a cyclic low molecular weight oligomeric poly(butylene terephthalate) resin with any additive, in any desired sequence, (ii) optionally applying the mixture obtained to the surface of a shaped article, and (iii) polymerizing the mixture.

Poly(butylene terephthalate) (PBT) is a known polymer. It is known to depolymerize PBT whereby a cyclic (also named macrocyclic) low molecular weight oligomeric poly(butylene terephthalate) resin of formula (I) is obtained:

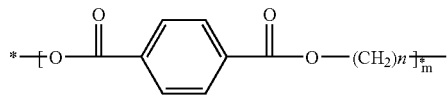

In an exemplary implementation of formula (I), n is 4 and m is an average number between 2 and 10, preferably between 2 and 5. The melting temperatures generally are in the range of from 140° C. to 190° C., preferably in the range of from 160° C. to 185° C., corresponding to melt viscosities at melting temperature within the range of about 35 mPa.s (SI-units) further decreasing with rising temperatures.

A catalyst can be used to polymerize the cyclic low molecular weight oligomeric poly(butylene terephthalate). A specific tin or titanium catalyst, preferably stannoxane, butyl-chlorotin dihydroxide [BuSnCl(OH)$_2$, CAS no. 13355-96-9] or tetrakis(2-ethyl)titanate can be used, whereby the cyclic ring opens and polymerizes, to yield a linear high molecular weight polymer without off-gassing and only a slight exothermic reaction caused by crystallisation. Such catalysts, the amounts and methods of using these catalyst, the polymerization conditions etc. are known in the art. High molecular weight PBT produced from cyclic oligomers has a melt temperature of about 220° C.

An exemplary basic formulation to be polymerized is, for example, composed of the cyclic oligomers of poly(butylene terephthalate) and the catalyst which initiates the polymerization reaction of the cyclic oligomers. The amount of catalyst added is, for example, on the order of 0.2-0.5% by weight. More may be added, which is not critical. Any known filler material used in electrical insulation, may be added in concentrations as given herein.

Within the meaning of the present disclosure, the expression "has been obtained by polymerizing a cyclic low molecular weight oligomeric poly(butylene terephthalate) resin" includes also compositions wherein said cyclic low molecular weight oligomeric poly(butylene terephthalate) resin contains up to 40% by weight of cyclic low molecular weight oligomeric compounds of formula (I), or a mixture thereof, wherein n is 2 or 3, i.e. cyclic low molecular weight oligomeric poly(ethylene terephthalate) and cyclic low molecular weight oligomeric poly(propylene terephthalate), preferably within the range of 5% to 40% by weight and m having values between 2 and 10, preferably between 2 and 5.

According to an embodiment of the present disclosure, the insulator system contains at least one filler material or a mixture of such filler materials. Filler materials for electrical isolation systems are known and are, for example, selected from the group comprising (e.g., consisting of) natural purified sands; silicon oxides and silicon hydroxides; aluminum oxides and aluminum hydroxides; titanium oxides and titanium hydroxides; zinc oxides and hydroxides; silicates, preferably sodium/potassium silicates, silicon aluminosilicates; mineral carbonates, preferably calcium-magnesium carbonate or calcium-silicon-magnesium carbonates; geopolymers, preferably trolites and/or zeolites based on aluminosilicates or other alkaline earth metals, glasses, mica, ceramic particles. Preferred are silicon oxides, aluminum oxides, titanium oxides, silicates, preferably silicon oxides (SiO$_2$, Quartz), aluminum oxides and hydroxides, zinc oxide, sodium/potassium silicates and/or silicon aluminosilicates. The filler may be surface treated, e.g. silanized, or untreated or be mixture thereof.

The mineral filler compound or the mixture of such compounds can have an exemplary average grain size (at least 50% of the grains) in the range of from about 1.0 µm to 200 µm, preferably in the range of from 1 µm to 100 µm, preferably in the range of from 5 µm to 50 µm, preferably in the range of from 5 µm to 40 µm, and especially in the range of from 5 µm to 35 µm.

The cyclic low molecular weight oligomeric poly(butylene terephthalate) resin, contains at least one filler material or a mixture of such filler materials in an amount of up to 85% by weight. The proportion of the filler material in the insulator system is preferably in the range of from 5% to 85% by weight, preferably in the range of from 40% to 80% by weight, and in particular in the range of from 60% to 80% by weight, preferably in the range of from 65% to 80% by weight, calculated to the total weight of the insulation system, i.e. polymer, filler and further additives.

In a further embodiment of the present disclosure, the electrical insulation system contains at least one hydrophobic compound or a mixture of such compounds that can, for example, be used for improving the self-healing properties of an electrical insulator. For this purpose the cyclic low molecular weight oligomeric poly(butylene terephthalate) resin is uniformly mixed with the hydrophobic compound or a mixture of the compounds, the hydrophobic compounds being selected from the group comprising (e.g., consisting of) flowable fluorinated or chlorinated hydrocarbons which contain —CH$_2$-units, —CHF-units, —CF$_2$-units, —CF$_3$-units, —CHCl-units, —C(Cl)$_2$-units, —C(Cl)$_3$-units, or mixtures thereof; or a cyclic, linear or branched flowable organopolysiloxane. The hydrophobic compound or the mixture of said compounds may be present in encapsulated form.

The hydrophobic compound has, for example, a viscosity in the range from 50 cSt to 10,000 cSt, preferably in the range from 100 cSt to 10,000 cSt, preferably in the range from 500 cSt to 3000 cSt, measured in accordance with DIN 53 019 at 20° C.

The hydrophobic compound can, for example, comprise a compound, or mixture of compounds, of the general formula (II):

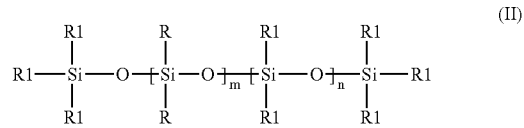

in which

R, determined independently at each occurrence, is defined as an unsubstituted or chlorinated or fluorinated alkyl radical having from 1 to 8 carbon atoms, (C$_1$-C$_4$-alkyl)aryl, or aryl;

R$_1$, as determined independently at each occurrence, has one of the definitions of R or R$_2$, it being possible for two terminal substituents R$_1$ attached to different Si atoms, being taken together to be an oxygen atom (=cyclic compound);

R$_2$ has one of the definitions of R, or is hydrogen or a radical -(A)$_r$-CH=CH$_2$; wherein A is a radical —C$_s$H$_{2s}$—, where s is an integer from 1 to 6;

r is zero or one;

m is on average from zero to 5000;

n is on average from zero to 100;

the sum of [m+n] for non-cyclic compounds being at least 20, and the sequence of the groups —[Si(R)(R)O]— and —[Si(R$_1$)(R$_2$)O]— in the molecule being arbitrary.

Preferred is the compound of the formula (II), wherein

R, as determined independently at each occurrence, is defined as an unsubstituted or fluorinated alkyl radical having from 1 to 4 carbon atoms or phenyl;

A is a radical —(CH$_2$)—, m is on average from 20 to 5000;

n is on average from 2 to 100;

the sum of [m+n] for non-cyclic compounds being on average in the range from 20 to 5000, and the sequence of the groups —[Si(R)(R)O]— and —[Si(R$_1$)(R$_2$)O]— in the molecule being arbitrary.

Preferred is the compound of the formula (II), wherein

R, as determined independently at each occurrence, is defined as 3,3,3-trifluoropropyl, monofluoromethyl, difluoromethyl, or alkyl having 1-4 carbon atoms;

A is a radical —(CH$_2$)—;

m is on average from 50 to 1500;

n is on average from 2 to 20; the sum of [m+n] for non-cyclic compounds being on average in the range from 50 to 1500, and the sequence of the groups —[Si(R)(R)O]— and —[Si(R$_1$)(R$_2$)O]— in the molecule being arbitrary. Most preferred is a compound of the formula (II) wherein each R is methyl.

Preferred cyclic compounds of formula (II) are those comprising 4-12, and preferably 4-8, —[Si(R)(R)O]-units or —[Si(R$_1$)(R$_2$)O]-units or a mixture of these units.

Preferred further are compounds of the formula (II) comprising a cyclic, linear or branched polydimethylsiloxane which additionally contains vinyl groups or allyl groups, preferably a cyclic, linear or branched organovinylpolysiloxane. The hydrophobic compound may be encapsulated.

The hydrophobic compound can be added to the cyclic low molecular weight oligomeric poly(butylene terephthalate) resin in, for example, an amount of from 0.1% to 10%, preferably in an amount of from 0.25% to 5% by weigh, preferably in an amount of from 0.25% to 3% by weight, calculated to the weight of the oligomeric poly(butylene terephthalate).

The electrical insulation system according to the present disclosure may optionally contain further additives. Such additives include, without limitation, antioxidants, compatibilizers, plasticizers, tougheners. Such compounds are known.

Preferred uses of the insulation systems produced according to the present disclosure are in combination with, for example, high-voltage insulations for indoor and outdoor use, especially for outdoor insulators associated with high-voltage lines, long-rod, composite and cap-type insulators, and also base insulators in the medium-voltage sector, in the production of insulators associated with outdoor power switches, measuring transducers, leadthroughs, and overvoltage protectors, switchgear construction, power switches, dry-type transformers, and electrical machines, coating materials for transistors and other semiconductor elements and/or impregnated electrical components. The present disclosure further encompasses electrical articles containing an electrical insulation system according to the present disclosure. The following discussion illustrates exemplary embodiments.

EXAMPLE 1

A formulation was prepared from the following components:

100 parts cyclic low molecular weight oligomers of poly(butylene terephthalate) (CBT®-XB3 from the Cyclics Corp.);

0.2 parts of the catalyst butylchloritin dihydride (Fascat® 4101, from Atofina Corp.); and 185 parts of dry silica powder (Millisil® B12 from Silhelco) having an average particle size ($d_{50\%}$) of 16 µm.

a) The oligomers of poly(butylene terephthalate) are melted at a temperature ranging from 130° C. to 180° C. and subsequently mixed with predried silica flower until an homogeneous mixture is obtained. The catalyst is then added so that the oligomers react and polymerize to form a high molecular weight poly(butylene terephthalate) thermoplastic.

b) Alternatively, the catalyst is first compounded with the oligomers of polyethylene terephthalate prior to mixing with the silica flower.

The high molecular polymer produced has a melt temperature of about 220° C., which is higher than the processing temperature so that demolding is possible with little or no cooling. The mixing phase is carried out with a known mixer, a brabender, an extruder, or an injection molding machine. The filled mould is heated to about 180-200° C. to allow the low molecular weight oligomers to react and form high molecular weight poly(butylene terephthalate). Alternatively, the reaction of the oligomers may take place prior to the filling of the mould. In this case the mixture is heated above 160° C. prior to filling.

EXAMPLE 2

Comparative Example

The properties of silica filled polybutylene terephthalate made from cyclic low molecular weight oligomers according to Example 1 are compared with the properties of silica filled anhydride-cured epoxies. The comparison of the properties is given in FIG. 1. In FIG. 1, the designations * and  refer to the following: Epoxy from Huntsman (CY 5622: 100 pbw, XW 1235: 90 pbw, DY 062)+355 pbw silanised silica Silbond W12 EST from Quarzwerke cured 6 h@80° C.+10 h@140° C. **CBT-XB 3 from Cyclics (100 pbw)+0.2 wt % Fastcat 4101 from Atofina+185 pbw silanised silica Silbond W12 MST from Quartzwerke cured 60 min@200° C.

EXAMPLE 3

Comparative Example

The evolution of the dielectric constant at 50 Hz of silane treated silica filled (65 wt %) polybutylene terephthalate made from cyclic low molecular weight oligomers analogous to Example 1 is compared with silica filled anhydride-cured (65 wt % silane treated silica) epoxies. The comparison of the properties is given in FIG. 2.

EXAMPLE 4

Comparative Example

Figure 3:
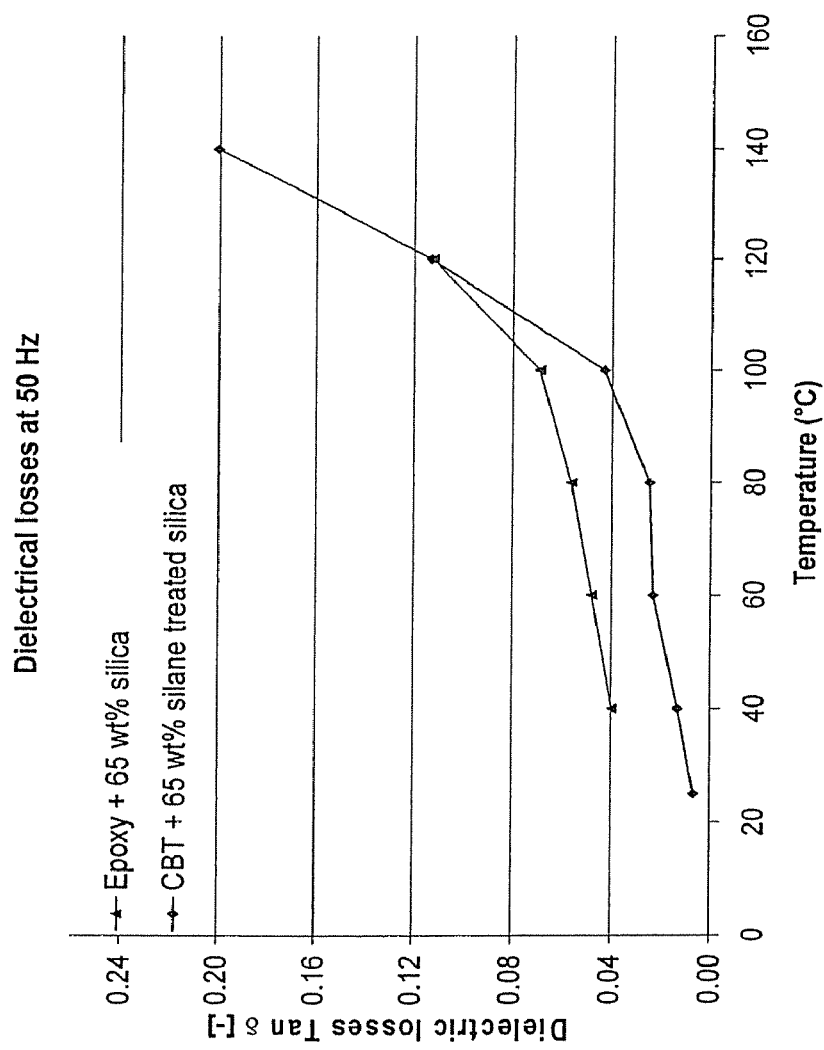
FIG. 3 shows an evolution of dielectric losses at 50 Hz of epoxy filled with 65 wt % silane treated silica and of CBT filled with 65 wt % silane treated silica with temperature.

The evolution of the dielectric losses at 50 Hz of silane treated silica filled (65 wt %) polybutylene terephthalate made from cyclic low molecular weight oligomers analogous to Example 1 is compared with silica filled anhydride-cured (65 wt % silane treated silica) epoxies. The comparison of the properties is given in FIG. 3.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. Electrical insulation system, comprising:
   poly(butylene terephthalate), wherein said poly(butylene terephthalate) contains a polymerized cyclic low molecular weight oligomeric poly(butylene terephthalate) resin, and additives which include at least one filler material or a mixture of such filler materials in an amount of from 5% to 85% by weight, calculated to a total weight of the insulation system,
   wherein the cyclic low molecular weight oligomeric poly (butylene terephthalate) resin corresponds to a general formula (I):

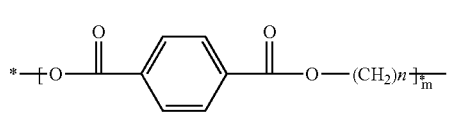

wherein n is 4 and m is an average number between 2 and 10.

2. Electrical insulation system according to claim 1, wherein said poly(butylene terephthalate) comprises at least one hydrophobic compound or a mixture of hydrophobic additives in an amount of 0.1% to 10% by weight, calculated to a total weight of the insulation system.

3. Electrical insulation system according to claim 1, wherein the cyclic low molecular weight oligomeric poly (butylene terephthalate) resin comprises:
   up to 40% by weight of a cyclic low molecular weight oligomeric compound of formula (I) or a mixture thereof, wherein n is 2 or 3, and m is an average number between 2 and 10.

4. Electrical insulation system according to claim 1, wherein:
   the at least one filler material or mixture of filler materials are selected from the group consisting of: natural purified sands; silicon oxides and hydroxides; aluminum oxides and hydroxides; titanium oxides and hydroxides; zinc oxides and hydroxides; silicates; mineral carbonates; and geopolymers.

5. Electrical insulation according to claim 4, wherein the filler material or the mixture of filler materials have an average grain size (at least 50% of the grains) in a range of from about 1.0 μm to 200 μm.

6. Electrical insulation system according to claim 1, wherein said electrical insulation system further comprises:
   at least one hydrophobic compound or a mixture of hydrophobic compounds selected from the group consisting of flowable fluorinated or chlorinated hydrocarbons which comprise —CH$_2$-units, —CHF-units, —CF$_2$-units, —CF$_3$-units, —CHCl-units, —C(Cl)$_2$-units, —C(Cl)$_3$- units, or mixtures thereof; and a cyclic, linear or branched flowable organopolysiloxane, wherein said hydrophobic compound is present in encapsulated form.

7. Electrical insulation system according to claim 6, wherein said hydrophobic compound has a viscosity in the range from 50 cSt to 10,000 cSt, measured in accordance with DIN 53 019 at 20° C.

8. Electrical insulation system according to claim 6, wherein said hydrophobic compound is a molecule which corresponds to a general formula (II):

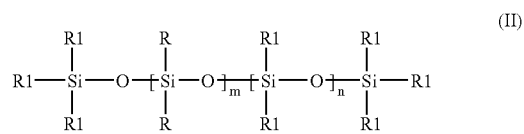

in which
R, as determined independently at each occurrence, is defined as an unsubstituted or chlorinated or fluorinated alkyl radical having from 1 to 8 carbon atoms, (C$_1$-C$_4$-alkyl)aryl, or aryl;
R$_1$, as determined independently at each occurrence, has a definition of R or R$_2$, it being possible for two terminal substituents R$_1$ attached to different Si atoms, being taken together to be an oxygen atom (=cyclic compound);
R$_2$ has one of the definitions of R, or is hydrogen or a radical -(A)$_r$-CH=CH$_2$, wherein
A is a radical —C$_s$H$_{2s}$—, where
s is an integer from 1 to 6;
r is zero or one;
m is on average from zero to 5000;
n is on average from zero to 100;
a sum of [m+n] for non-cyclic compounds being at least 20, and a sequence of groups —[Si(R)(R)O]— and —[Si(R$_1$)(R$_2$)O]— in the molecule being arbitrary.

9. Electrical insulation system according to claim 8, wherein R, as determined independently at each occurrence, is an unsubstituted or fluorinated alkyl radical having from 1 to 4 carbon atoms or phenyl;
   A is a radical —(CH$_2$)—,
   m is on average from 20 to 5000;
   n is on average from 2 to 100; and
   a sum of [m+n] for non-cyclic compounds is on average in a range from 20 to 5000, and the sequence of the groups —[Si(R)(R)O]— and —[Si(R$_1$)(R$_2$)O]— in the molecule is arbitrary.

10. Electrical insulation system according to claim 8, wherein R, as determined independently at each occurrence is 3,3,3-trifluoropropyl, monofluoromethyl, difluoromethyl, or alkyl having 1-4 carbon atoms;
    A is a radical —(CH$_2$)—;
    m is on average from 50 to 1500;
    n is on average from 2 to 20; and
    a sum of [m+n] for non-cyclic compounds is on average in a range from 50 to 1500, and the sequence of the groups —[Si(R)(R)O]— and —[Si(R$_1$)(R$_2$)O]— in the molecule is arbitrary.

11. Electrical insulation system according to claim 8, wherein the compound of the formula (II) is a cyclic compound comprising 4-12 —[Si(R)(R)O]-units or —[Si(R$_1$)(R$_2$)O]-units or a mixture of these units.

12. Electrical insulation system according to claim 8, wherein the compound of the formula (II) is added in an amount of from 0.1% to 10% by weight, calculated to a weight of the oligomeric poly(butylene terephthalate) resin.

13. Electrical insulation system according to claim 1, in combination with at least one of a high-voltage line, a long-rod, composite or cap-insulator device, a base insulator in a medium-voltage sector, an outdoor power switch, a measuring transducer, a leadthrough, an overvoltage protector, a switch-gear, a power switch, a dry transformer, an electrical machine, a coating material for a transistor or other semiconductor element and/or an impregnated electrical component.

14. An electrical article comprising:
an electrical insulation system of poly(butylene terephthalate), wherein said poly(butylene terephthalate) contains a polymerized a cyclic low molecular weight oligomeric poly(butylene terephthalate) resin, and additives which include at least one filler material or a mixture of such filler materials in an amount of from 5% to 85% by weight, calculated to a total weight of the insulation system,
wherein the cyclic low molecular weight oligomeric poly(butylene terephthalate) resin corresponds to a general formula (I):

$$*\!-\!\!\left[\!\!O-\!\!\overset{O}{\underset{\|}{C}}\!\!-\!\!\!\!\begin{array}{c}\phantom{X}\\\phantom{X}\end{array}\!\!\!\!-\!\!\overset{O}{\underset{\|}{C}}\!\!-\!\!O-\!(CH_2)n\!\right]_m\!\!\!\!-\!* \quad (I)$$

wherein n is 4 and m is an average number between 2 and 10.

15. Method of making an electrical insulation system based on poly(butylene terephthalate), wherein said poly(butylene terephthalate) contains a polymerized a cyclic low molecular weight oligomeric poly(butylene terephthalate) resin, and additives which include at least one filler material or a mixture of such filler materials in an amount of from 5% to 85% by weight, calculated to a total weight of the insulation system,
wherein the cyclic low molecular weight oligomeric poly(butylene terephthalate) resin corresponds to a general formula (I):

$$*\!-\!\!\left[\!\!O-\!\!\overset{O}{\underset{\|}{C}}\!\!-\!\!\!\!\begin{array}{c}\phantom{X}\\\phantom{X}\end{array}\!\!\!\!-\!\!\overset{O}{\underset{\|}{C}}\!\!-\!\!O-\!(CH_2)n\!\right]_m\!\!\!\!-\!* \quad (I)$$

wherein n is 4 and m is an average number between 2 and 10,
the method comprising:
(i) mixing a cyclic low molecular weight oligomeric poly(butylene terephthalate) resin in any desired sequence with additives to form a mixture;
(ii) applying the mixture to a surface of a shaped article; and
(iii) polymerizing the mixture.

16. Electrical insulation system according to claim 3, wherein
the at least one filler material or mixture of filler materials are selected from the group consisting of natural purified sands; silicon oxides and hydroxides; aluminum oxides and hydroxides; titanium oxides and hydroxides; zinc oxides and hydroxides; silicates; mineral carbonates; and geopolymers.

17. Electrical insulation system according to claim 11, wherein the compound of the formula (II) is added in an amount of from 0.1% to 10%, calculated to the weight of the oligomeric poly(butylene terephthalate) resin.

18. Method of making an electrical insulation system according to claim 15, wherein said electrical insulation system further comprises:
at least one hydrophobic compound or a mixture of hydrophobic compounds selected from the group consisting of: flowable fluorinated or chlorinated hydrocarbons which comprise —$CH_2$-units, —CHF-units, —$CF_2$-units, —$CF_3$-units, —CHCl-units, —$C(Cl)_2$-units, —$C(Cl)_3$-units, or mixtures thereof; and a cyclic, linear or branched flowable organopolysiloxane, wherein said hydrophobic compound is present in encapsulated form.

19. Electrical insulation system according to claim 2, wherein the hydrophobic compound is an organopolysiloxane.

20. Electrical insulation system according to claim 1, wherein m is an average number between 2 and 5.

21. Electrical insulation system according to claim 3, wherein the oligomeric compound is within the range of 5% by weight to 40% by weight, and m is an average number between 2 and 5.

22. Electrical insulation system according to claim 1, wherein the filler or filler materials are selected from the group consisting of: silicon oxides including $SiO_2$ and Quartz, aluminum oxides and hydroxides, zinc oxide, sodium/potassium silicates and silicon aluminosilicates.

23. Electrical insulation system according to claim 4, wherein the filler material or the mixture of filler materials have an average grain size (at least 50% of the grains) in a range of from 5 μm to 35 μm.

24. Electrical insulation system according to claim 4, wherein the filler material or the mixture of the filler materials is present in a range of from 65% to 80% by weight.

25. Electrical insulation system according to claim 6, wherein said hydrophobic compound has a viscosity in a range from 500 cSt to 3000 cSt.

26. Electrical insulation system according to claim 8, wherein each R is methyl.

27. Electrical insulation system according to claim 11, wherein the hydrophobic compound is a cyclic, linear or branched organovinylpolysiloxane, said silanes being encapsulated.

28. Electrical insulation system according to claim 8, wherein the compound of the formula (II) is added in an amount of from 0.25% to 3% by weight.

29. Electrical insulation system according to claim 3, wherein
the at least one filler material or mixture of filler materials are selected from the group consisting of: silicon oxides, aluminum oxides, titanium oxides, silicates, including silicon oxides ($SiO_2$, Quartz), aluminum oxides and hydroxides, zinc oxide, sodium/potassium silicates and/or silicon aluminosilicates, which are surface treated, and/or silanized.

30. Electrical insulation according to claim 5, wherein the filler material or the mixture of filler materials is present in an amount in a range of from 65% to 80% by weight.

31. Electrical insulation system according to claim 11, wherein the compound of the formula (II) is added in an amount of from 0.25% to 3% by weight.

32. Electrical insulation system according to claim 4, wherein the silicates comprise sodium/potassium silicates or silicon aluminosilicates; the mineral carbonates comprise calcium-magnesium carbonate or calcium-silicon-magnesium carbonates; and the geopolymers comprise trolites and zeolites based on aluminosilicates or other alkaline earth metals, glasses, mica, ceramic particles.

33. Electrical insulation system according to claim 16, wherein the silicates comprise sodium/potassium silicates or silicon aluminosilicates; the mineral carbonates comprise calcium-magnesium carbonate or calcium-silicon-magnesium carbonates; and the geopolymers comprise trolites and zeolites based on aluminosilicates or other alkaline earth metals, glasses, mica, ceramic particles.

34. Electrical insulation system according to claim 22, wherein the silicon aluminosilicates are surface treated and/or silanized.

\* \* \* \* \*